(12) United States Patent
Lofthouse et al.

(10) Patent No.: US 11,301,558 B2
(45) Date of Patent: Apr. 12, 2022

(54) AUTOMATIC SECURE STORAGE OF CREDENTIALS WITHIN A MANAGED CONFIGURATION MODEL

(71) Applicant: Red Hat, Inc., Raleigh, NC (US)

(72) Inventors: Darran Andrew Lofthouse, Bedfordshire (GB); Farah Juma, Toronto (CA)

(73) Assignee: RED HAT INC., Raleigh, NC (US)

( * ) Notice: Subject to any disclaimer, the term of this patent is extended or adjusted under 35 U.S.C. 154(b) by 299 days.

(21) Appl. No.: 16/547,131

(22) Filed: Aug. 21, 2019

(65) Prior Publication Data

US 2021/0056194 A1    Feb. 25, 2021

(51) Int. Cl.
| G06F 21/45 | (2013.01) |
| G06F 21/60 | (2013.01) |
| G06F 21/62 | (2013.01) |
| G06F 21/40 | (2013.01) |

(52) U.S. Cl.
CPC .............. *G06F 21/45* (2013.01); *G06F 21/40* (2013.01); *G06F 21/604* (2013.01); *G06F 21/6209* (2013.01)

(58) Field of Classification Search
None
See application file for complete search history.

(56) References Cited

U.S. PATENT DOCUMENTS

| 7,676,829 B1* | 3/2010 | Gui .......................... G06F 21/31 726/5 |
| 8,918,637 B2 | 12/2014 | Wentker et al. |
| 9,241,008 B2 | 1/2016 | Powell et al. |
| 9,515,999 B2 | 12/2016 | Ylonen |
| 2002/0103703 A1* | 8/2002 | Spetalnick ......... G06Q 30/0258 705/14.26 |
| 2003/0041198 A1* | 2/2003 | Exton .................. G06F 21/6218 710/200 |
| 2003/0056092 A1* | 3/2003 | Edgett ................. H04L 63/0442 713/153 |
| 2003/0110304 A1* | 6/2003 | Iwaishi ................. G06F 16/957 709/250 |
| 2004/0117302 A1* | 6/2004 | Weichert ............. G06Q 20/108 705/40 |

(Continued)

OTHER PUBLICATIONS

"Using Elytron Credential Stores in WildFly." WildFly | JBoss Application Server | Openshift Tutorials, 2019, www.mastertheboss.com/jboss-server/jboss-security/using-credential-stores-to-store-your-passwords-in-wildfly-11.

(Continued)

*Primary Examiner* — William J. Goodchild
(74) *Attorney, Agent, or Firm* — Haynes and Boone, LLP (57) ABSTRACT

A method includes with a computing system, receiving an attribute within a managed configuration model, the attribute referencing a credential store and associated with a resource, with the computing system, in response to determining that the attribute includes both an alias and a clear-text password, determining whether there is a matching entry within the credential store, and in response to determining that the credential store does not contain a matching entry: creating a new entry for the credential store, wherein the new entry includes the clear-text password and is uniquely identifiable using the alias, and removing the clear-text password from the managed configuration model.

15 Claims, 4 Drawing Sheets

(56) References Cited

U.S. PATENT DOCUMENTS

| | | | | |
|---|---|---|---|---|
| 2005/0108579 | A1* | 5/2005 | Isaacson | G06F 21/31 726/19 |
| 2014/0003591 | A1* | 1/2014 | Estrada | H04M 17/307 379/114.16 |
| 2014/0310532 | A1* | 10/2014 | Ali | G06F 12/1408 713/189 |
| 2015/0254452 | A1* | 9/2015 | Kohlenberg | G06F 21/554 726/6 |
| 2015/0312242 | A1 | 10/2015 | Ogawa | |
| 2017/0171175 | A1* | 6/2017 | Ylonen | H04L 9/0891 |
| 2018/0321967 | A1 | 11/2018 | Barker et al. | |

OTHER PUBLICATIONS

"Red Hat JBoss Enterprise Application Platform 7.2—How to Configure Server Security" Red Hat Customer Portal, Apr. 11, 2019, access.redhat.com/documentation/en-us/red_hat_jboss_enterprise_application_platform/7.2/html/how_to_configure_server_security/securely_storing_credentials.

"Database Security Guide—Configuring Authentication", Jun. 5, 2017, docs.oracle.com/database/121/DBSEG/authentication.htm#DBSEG30321.

* cited by examiner

AUTOMATIC SECURE STORAGE OF CREDENTIALS WITHIN A MANAGED CONFIGURATION MODEL

BACKGROUND

The present disclosure relates generally to managed configuration models, and more particularly, automating the secure storage of credentials when applied directly to a managed configuration model via remote operations.

Various applications include several components that run on various servers. For example, a particular application may be deployed on an application server. That application may include references to multiple types of resources such as databases or other software modules. Many of those resources are secured. In other words, the application needs to use a set of credentials (such as a password) to access such resources.

As various applications become increasingly large and complex, system administrators may use various tools to manage them. One such tool is a managed configuration model. A managed configuration model allows an administrator to define the structure of a particular software application. This may include the manner in which various components of the application utilize resources from other components. It is desirable that such managed configuration models balance ease of use with security.

SUMMARY

According to one example, a method comprising with a computing system, receiving an attribute within a managed configuration model, the attribute referencing a credential store, the attribute associated with a resource, with the computing system, in response to determining that the attribute includes both an alias and a clear-text password, determining whether there is a matching entry within the credential store, and with the computing system, in response to determining that the credential store does not contain a matching entry: creating a new entry in the credential store, wherein the new entry includes the clear-text password and is uniquely identifiable using the alias, and removing the clear-text password from the managed configuration model.

According to one example, a method comprising with a computing system, receiving for a managed configuration model, a first attribute that references a credential from a credential store, the attribute including both an alias and a clear-text password, with the computing system, in response to determining that the credential store includes an entry matching the first attribute: updating the entry to include the clear-text password, and removing the clear-text password from the model.

According to one example, a system comprising a processor, and a memory comprising machine readable instructions that when executed by the processor, cause the system to: receive an attribute within a managed configuration model, the attribute referencing a credential store, the attribute associated with a resource, in response to determining that the attribute includes both an alias and a clear-text password, determine whether there is a matching entry within the credential store, and in response to determining that the credential store does not contain a matching entry: create a new entry in the credential store, wherein the new entry includes the clear-text password and is uniquely identifiable using the alias, and remove the clear-text password from the managed configuration model.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As mentioned above, it is desirable that managed configuration models balance ease of use with security. Managed configuration models define how an application accesses various resources such as databases or other processing modules. However, because the managed configuration model is often stored on persistent storage as a file (e.g., an eXtensible Markup Language (XML) file), it is not desired that the credentials for accessing various resources be stored in clear-text (i.e., unencrypted).

A managed configuration model may utilize a credential store to manage the credentials used by the model. Utilizing credential stores in configuration models is an efficient way to allow for the remote storage of credentials corresponding to applications. The administrator may not want to have the task of storing and managing numerous credentials corresponding numerous applications. For example, an application running on an application server may have its own identity that is utilized by remote calls. By way of example, when a remote call requires the application server to access the database server, the database server may require the application server to be authenticated using a set of credentials in order to allow the application server access to the database server.

Traditionally, an administrator would need to first manually create and populate a credential store for the credentials. The credential store would then need to be added to a configuration model and the credentials would subsequently be referenced from across the model. Unfortunately, the number of steps that involve an administrator to create, populate, and cross reference the credential store are many.

There also may be integrity and security issues in relation to any credential store entry mistakes. For example, if there was a cross reference mistake in the credential store, an administrator would have to first determine that a mistake was made, as well as try to find the credential that had the error, and then correct the error. This leads not only to an inefficient system, but also a system that contained errors, as administrators are not always able to discern that an error existed, much less find and correct the error. Thus, a need exists to relieve some of the burden placed upon the administrator and to allow for some of the management of the credential store to be automated.

According to principles described herein the administrator is granted additional flexibility by being able to specify within a managed configuration model, an attribute that includes both an alias and a clear-text password. The system will then automatically handle the alias and the clear-text password securely. Without the use of principles described herein, administrators would have to use attributes that define either the alias or the clear-text password, but not both. If the alias attribute is set, then the credential-store attribute may also be set to cross-reference the relevant credential store.

In more detail, for a particular resource, the administrator may specify an attribute that references a credential store within a managed configuration model. This may be done using a computing system associated with the managed configuration model. The attribute may include a credential store reference, as well as an alias and clear-text password. After determining that the attribute includes both an alias and a clear-text password, the system will determine whether a matching entry in the credential store for the alias already exists. If not, the system will create a new entry in the credential store with the alias and password specified in the attribute. If, however, there is an entry in the credential store, that entry will be updated with the clear-text password specified in the attribute. In both cases, the clear-text password is removed from the model before the model is stored onto a persistent storage device.

Additionally, the administrator is able to specify attributes that have a clear-text password with a credential store reference and no alias. As a result, the system may automatically create a new entry in the credential store, automatically generate an alias, and populate the entry with the information from the attribute and the store using the automatically generated alias. Furthermore, the administrator is able to specify attributes that have an alias and no clear-text password. In such situations, the system may retrieve the reference to the credential from the credential store. By using the methods and system as discussed below, the amount of time and knowledge required of the administrator is reduced, because the details regarding how the alias and clear-text passwords are persistently stored are abstracted from the administrator. In other words, the administrator does not have to manually manage how the credentials are stored. This increases system efficiency, while also allowing for system flexibility.

Figure 1:
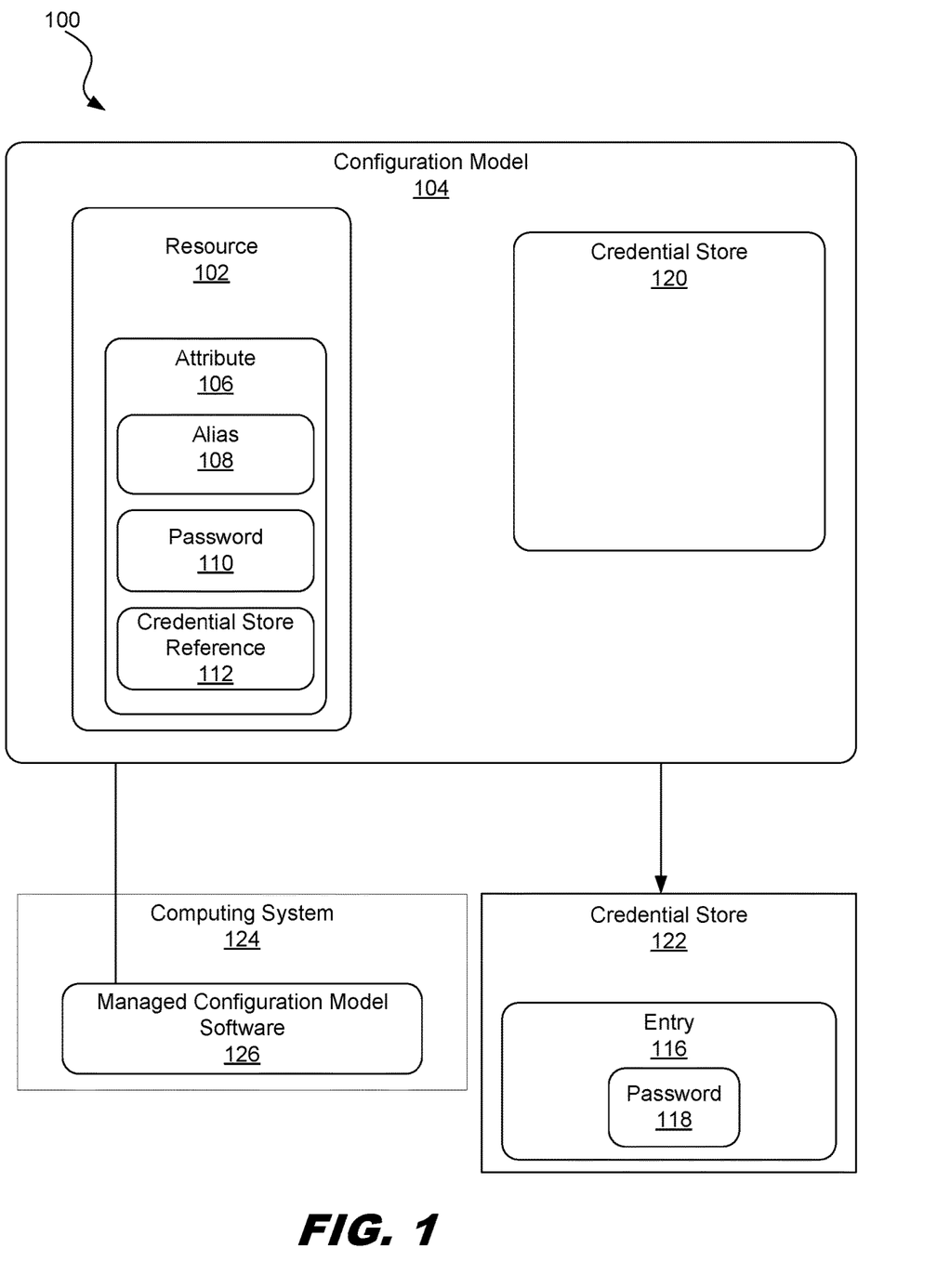
FIG. 1 is a diagram showing an illustrative configuration model involving a credential store with credential attributes, according to one example of principles described herein.

FIG. 1 is a diagram 100 showing an illustrative managed configuration model involving a credential store with credential attributes. According to the present example, the managed configuration model 104 is a tool that may be used by administrators to define how a particular application is deployed. For example, the configuration model 104 may define how a particular application is structure. The configuration model 104 may define various resources 102, which may include databases or other software modules from which an application obtains data and services.

The configuration model 104 may be represented as a file such as an XML file. An administrator may create the managed configuration model for a particular application using a piece of software, which will be referred to as the managed configuration model software 126. The administrator may use the software 126 to define a resource 102 within the model 104. For example, the administrator may provide a Universal Resource Indicator (URI) to a database on a network. Such a resource may require authentication to access. Thus, the configuration model 104 defines credentials for that resource.

This may be done by an attribute 106 that includes an alias 108, a clear-text password 110, and a credential store reference 112. More specifically, the attribute 106 may include at least three fields that include a name of an alias 108, a credential store reference identifier 112, and a clear-text password 110. The alias may represent, for example, an identifier that acts as a cross-reference to the credential store allowing for a specific entry to be identified. The specific entry may contain the clear-text password for authentication purposes in order to access a particular resource, such as using the credentials to access a database or to communicate with remote services. Additionally, for example, the credential store reference identifier may be a unique identifier in order to identify the particular uniquely named credential store. By way of further example, the attribute may include additional fields, such as a credential store instance identifier and/or a timestamp.

The alias 108 may be used to uniquely reference an entry within the credential store 120. The clear-text password may be a password defined by the administrator for access to the resource 102. The credential store reference 112 references a credential store 120 within the configuration model. While the present example illustrates only one resource 102 and one credential store 120, a practical configuration model 104 may include multiple resources and multiple credential stores.

While the configuration model 104 illustrates only the single resource by itself, it is understood that the configuration model 104 may define the resource 102 within a hierarchical description of an application architecture. For example, the configuration model may use a tree structure to define an application architecture, with the resource 102 being one branch of the tree.

The credential store 122 maintains several entries that store credentials for various resources such as resource 102. An example entry 116 includes a clear-text password field 118. The password field may include the clear-text password used by resource 102.

The credential store 120 within the configuration model 104 may be implemented on a computing system (e.g., 124) associated with the application modeled by the configuration model 104. Thus, when the application is running and accesses a particular resource, it will use the credentials defined within the implemented credential store to do so.

Figure 2:
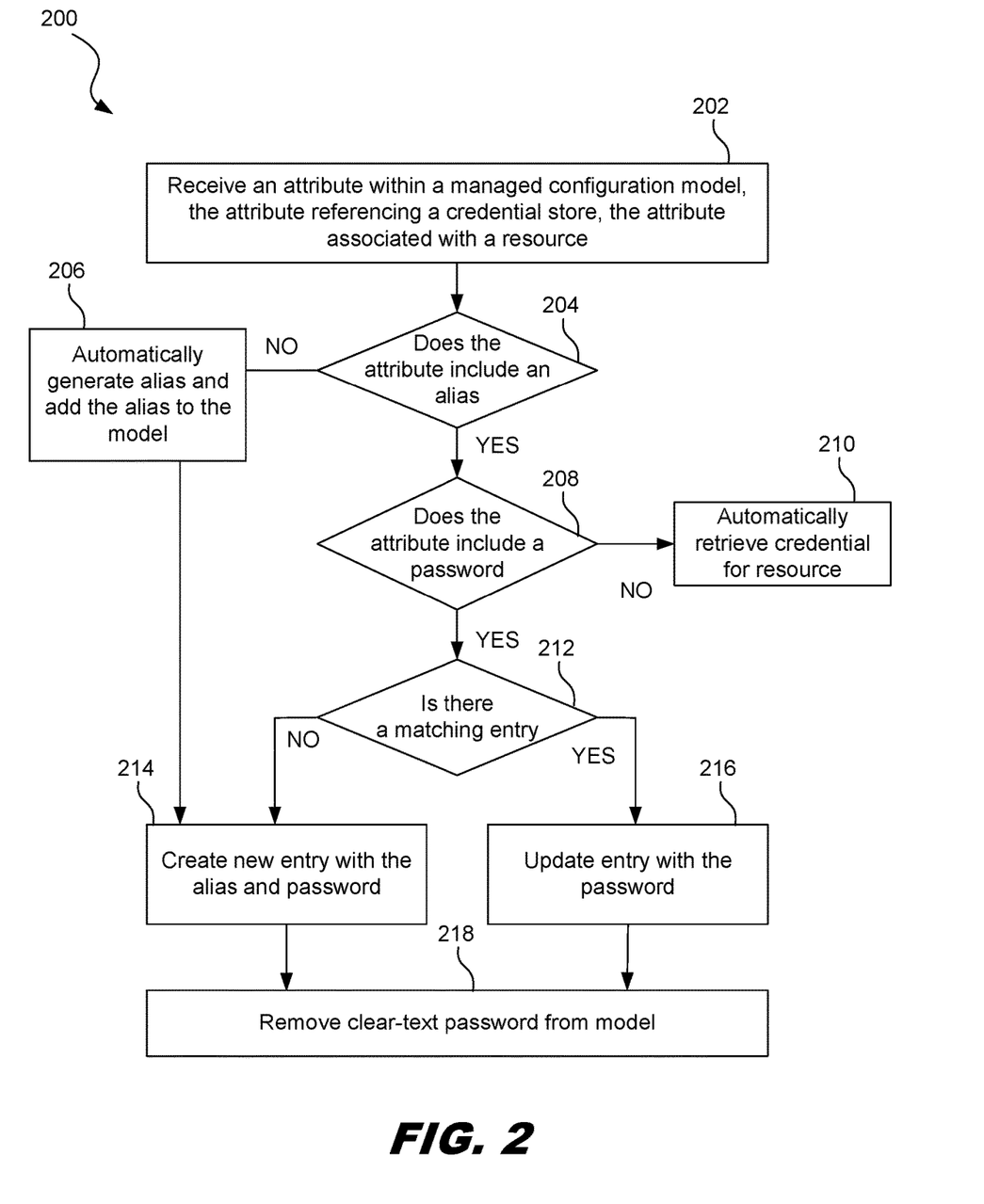
FIG. 2 is a flow diagram showing an illustrative method for automatic secure storage of credentials within a model, according to one example of principles described herein.

FIG. 2 is a flow diagram showing an illustrative method 200 for automatic secure storage of credentials within a model. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 202, a computing system (e.g., 124) receives an attribute (e.g., 106) within a managed configuration model. The attribute 106 is a component of a resource 102. Additionally, the attribute may reference a credential store. As described above, the attribute 106 may include an alias 108, a clear-text password 110, and the credential store reference 112. In some examples, as will be described in further detail below, the attribute may include an alias without a clear-text password or may include a clear-text password without an alias. In one example, the computing system may receive the attribute from an administrator. For example, an administrator may input the attribute directly via a Graphical User Interface (GUI). The administrator may input the attribute over a network.

At action 204, the computing system determines whether the attribute includes an alias. If it is determined at action 204 that the attribute does not include an alias, the computing system will proceed to action 206. At action 206, the system automatically generates an alias. After automatically generating the alias, the system proceeds to action 214. At action 214, the system creates a new entry in the credential store. The new entry is stored using the automatically generated alias and includes a clear-text password specified in the attribute. Additionally, the generated alias may be added to the model.

If, however, action 204 it is determined that the attribute does indeed include an alias, the system proceeds to action 208. At action 208, the system determines whether the attribute includes a password. If it is determined at action 208 that the attribute does not include a password, then the system proceeds to action 210. At action 210, the system will automatically retrieve from the credential store, the referenced credential required by the resource.

If, however, at action 208 it is determined that the attribute does indeed include a password, then the system proceeds to action 212. At action 212, after determining that the attribute includes both an alias and a clear-text password, the system determines whether there is a matching entry in the credential store. If it is determined that there is not a matching entry in the credential store, the system proceeds to action 214. At action 214, the system creates a new entry within the credential store using the alias. The new entry may include, the clear-text password that was included in the attribute. The system then proceeds to action 218.

If, however, it is determined at action 212, that there is indeed a matching entry in the credential store, the system proceeds to action 216. At action 216, the system updates the matching entry in the credential store. The updated entry, which is uniquely identifiable by the alias, may include the clear-text password specified in the attribute.

After both action 214 and action 216, the system proceeds to action 218. At action 218, the system removes the clear-text password from the configuration model. Thus, when the file that is used to represent the model is stored on a persistent (i.e., non-volatile) memory store, it will not include the clear-text password. This allows the security of the system to be maintained without having an administrator manually make entries to the credential store and then reference those entries from across the model.

Figure 3:
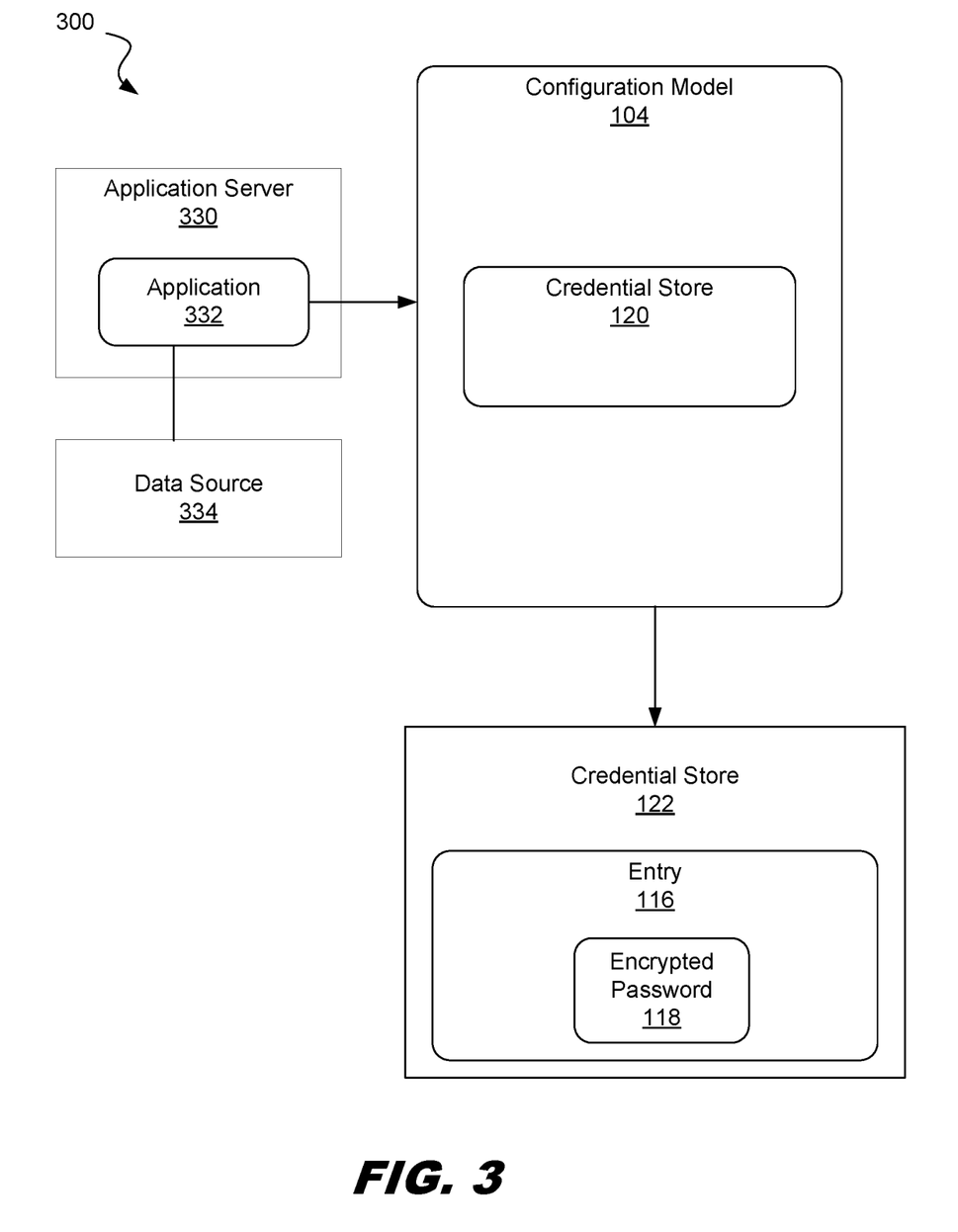
FIG. 3 is a diagram showing an application that uses the configuration model, according to one example of principles described herein.

FIG. 3 is a diagram showing an application 332 that uses the configuration model 104. The application 332 runs on an application server 330. The application server 330 may run applications, such as application 332, that use credentials from the credential store 120 to access the data source 334. Examples of application 332 may include, for example, web applications or communication applications. Additionally, for example, the data source may be a data base with user content data or a data storage server that stores information an application needs to run.

In other words, when new entries are added to the credential store 120 in the model 104, they may be stored in a manner so as to be usable by an application 132 that uses credentials in the credential store 302 to access a particular resource (e.g., data source 134).

In the present example, entries within the credential store 120 of the model 104 may be populated to the implemented credential store 122. The implemented credential store 122 may include a number of entries 116. Each entry, which is uniquely identifiable using an alias, may include a password 118. However, the password 118 is encrypted.

The encryption may be either a symmetric encryption mechanism or an asymmetric encryption mechanism. The symmetric encryption mechanism may use, for example a single encryption key for both the encryption and decryption of the clear-text password. On the other hand, for example, the asymmetric encryption mechanism may use public and private keys to encrypt and decrypt the clear-text password. Additionally, for example, the password may not be stored in the credential store, but instead, the password may be stored in a separate store. By way of further example, the separate store may be on a completely different or remote system. In some examples, in response to encrypting the clear-text password field, the clear-text password is removed from the configuration model as shown in action 218 above.

Figure 4:
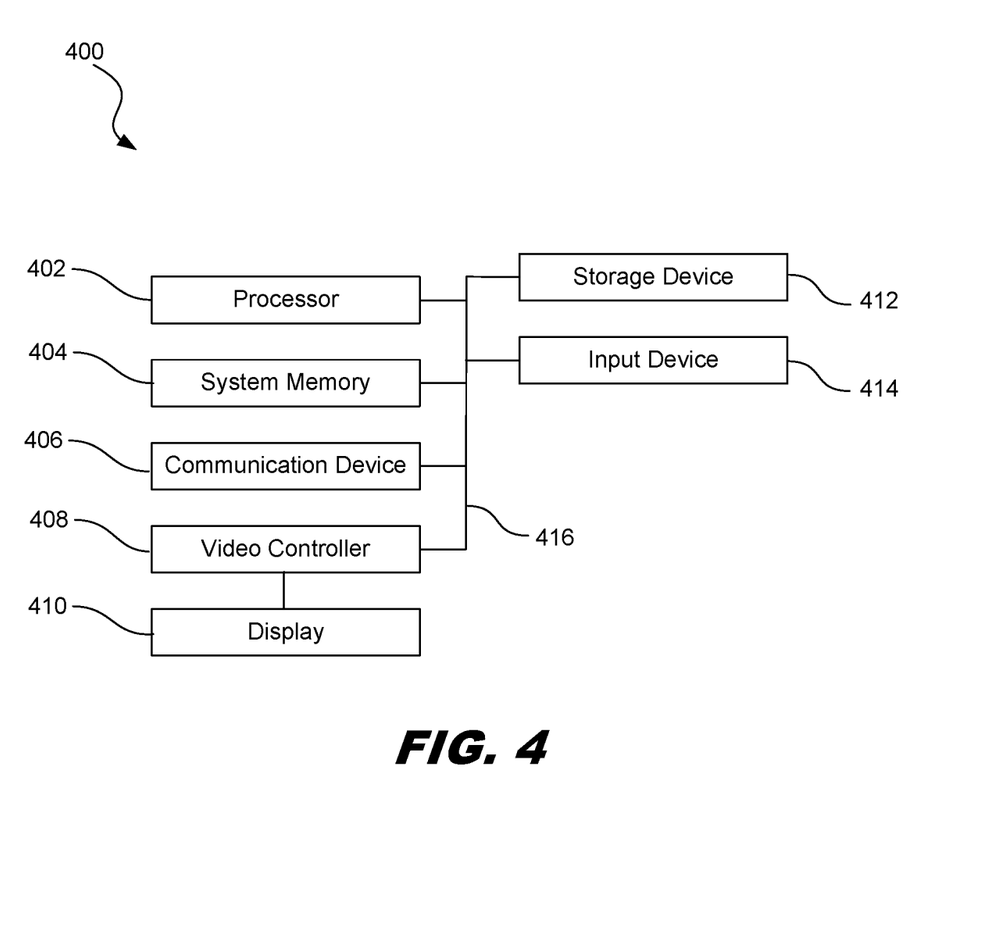
FIG. 4 is a diagram showing an illustrative computing system that may be used for automatic secure storage of credentials within a model, according to one example of principles described herein.

FIG. 4 is a diagram showing an illustrative computing system 400 that may be used to perform automatic secure storage of credentials for a managed configuration model. According to the present example, the computing system 400 includes a processor 402, an input device 414, a storage device 412, a video controller 408, a system memory 404, a display 410, and a communication device 406, all of which are interconnected by one or more buses 416.

The storage device 412 may include a computer readable medium that can store data. The storage device 412 may include volatile memory storage devices such as Random Access Memory (RAM) as well as non-volatile memory storage devices such as solid state memory components. The computer readable medium may be a non-transitory tangible media.

In some examples, the communication device 406 may include a modem, network card, or any other device to enable the computing system 400 to communicate with other computing devices. In some examples, any computing device represents a plurality of interconnected (whether by intranet or Internet) computer systems, including without limitation, personal computers, mainframes, PDAs, smart-phones and cell phones.

A computing system such as the computing system 400 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 404, and/or any combination thereof, may be executed by a processor 402 to cause the processor 402 to carry out or implement in whole or in part the operation of the computing system 400, one or more of the methods. In some examples, such a processor 402 may execute the plurality of instructions in connection with a virtual computer system.

Some examples of processing systems described herein may include non-transitory, tangible, machine readable media that include executable code that when run by one or more processors (e.g., processor 402) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

The invention claimed is:

1. A method comprising:
with a computing system, receiving a first attribute within a managed configuration model, the first attribute referencing a credential store, the first attribute associated with a resource;
with the computing system, in response to determining that the first attribute includes both an alias and a clear-text password, determining whether there is a matching entry within the credential store; and
with the computing system, in response to determining that the credential store does not contain a matching entry:
creating a new entry in the credential store, wherein the new entry includes the clear-text password and is uniquely identifiable using the alias; and
removing the clear-text password from the managed configuration model;
with the computing system, in response to receiving a second attribute, the second attribute including a clear-text password and omitting an alias, automatically generating a new alias; and
with the computing system, in response to generating the new alias, creating a new entry for the credential store, the new entry including the clear-text password and being uniquely identifiable using the new alias.

2. The method of claim 1, further comprising, in response to determining that the credential store includes a matching entry:
replacing the matching entry with a new entry that includes the clear-text password and is uniquely identifiable using the alias; and
removing the clear-text password from the managed configuration model.

3. The method of claim 1, further comprising, populating the credential store with the new entry.

4. The method of claim 3, wherein populating the new entry includes encrypting the clear-text password to create an encrypted password.

5. The method of claim 4, wherein removing the clear-text password form the managed configuration model is in response to encrypting the clear-text password.

6. The method of claim 1, wherein the resource comprises a data source.

7. The method of claim 1, further comprising, storing the managed configuration model in an eXtensible Markup Language (XML) file.

8. A method comprising:
- with a computing system, receiving for a managed configuration model, a first attribute that references a credential from a credential store, the attribute including both an alias and a clear-text password;
- with the computing system, in response to determining that the credential store includes an entry matching the first attribute:
  - updating the entry to include the clear-text password; and
  - removing the clear-text password from the model;
- with the computing system, in response to receiving a second attribute, the second attribute including a clear-text password and omitting an alias, automatically generating a new alias; and
- with the computing system, in response to generating the new alias, creating a new entry for the credential store, the new entry including the clear-text password and being uniquely identifiable using the new alias.

9. The method of claim 8, wherein updating the entry includes encrypting the clear-text password.

10. The method of claim 8, further comprising, storing the managed configuration model in a file after removing the clear-text password from the model.

11. The method of claim 8, further comprising, receiving a third attribute, the third attribute including an alias and omitting a clear-text password.

12. The method of claim 11, further comprising, in response to receiving the third attribute, retrieving a referenced credential associated with the third attribute.

13. The method of claim 8, further comprising, removing the clear-text password from the managed configuration model.

14. A system comprising:
- a processor; and
- a memory comprising machine readable instructions that when executed by the processor, cause the system to:
- receive first attribute within a managed configuration model, the first attribute referencing a credential store, the first attribute associated with a resource;
- in response to determining that the first attribute includes both an alias and a clear-text password, determine whether there is a matching entry within the credential store; and
- in response to determining that the credential store does not contain a matching entry:
  - create a new entry in the credential store, wherein the new entry includes the clear-text password and is uniquely identifiable using the alias; and
  - remove the clear-text password from the managed configuration model;
- in response to receiving a second attribute, the second attribute including a clear-text password and omitting an alias, automatically generating a new alias; and
- in response to generating the new alias, creating a new entry for the credential store, the new entry including the clear-text password and being uniquely identifiable using the new alias.

15. The system of claim 14, wherein the system is further to, in response to determining that the credential store includes a matching entry:
- replace the matching entry with a new entry that includes the clear-text password; and
- remove the clear-text password from the managed configuration model.

* * * * *